(12) United States Patent
Hedayat et al.

(10) Patent No.: US 7,363,827 B2
(45) Date of Patent: Apr. 29, 2008

(54) TORQUE SENSOR SYSTEM INCLUDING AN ELLIPTICALLY MAGNETIZED SHAFT

(75) Inventors: Kayvan Hedayat, Weston, MA (US); Norman Poirier, Raynham, MA (US)

(73) Assignee: Stoneridge Control Devices, Inc., Canton, MA (US)

( * ) Notice: Subject to any disclaimer, the term of this patent is extended or adjusted under 35 U.S.C. 154(b) by 158 days.

(21) Appl. No.: 11/270,049

(22) Filed: Nov. 9, 2005

(65) Prior Publication Data

US 2007/0113683 A1 May 24, 2007

Related U.S. Application Data

(60) Provisional application No. 60/729,383, filed on Oct. 21, 2005.

(51) Int. Cl.
*G01L 3/10* (2006.01)
*H01F 1/03* (2006.01)

(52) U.S. Cl. .......................... 73/862.333; 73/862.331; 148/100

(58) Field of Classification Search ........... 73/862.333, 73/862.331; 29/719; 148/100–104, 108; 75/10.14
See application file for complete search history.

(56) References Cited

U.S. PATENT DOCUMENTS

| | | | |
|---|---|---|---|
| 2,511,178 A | 6/1950 | Roters | 73/136 |
| 2,521,905 A | 9/1950 | Feller | 73/136 |
| 2,895,331 A | 7/1959 | Dahle | 73/136 |
| 3,083,353 A | 3/1963 | Bobeck | 340/174 |
| 3,274,826 A | 9/1966 | Ingram | 73/136 |
| 3,426,588 A | 2/1969 | Duda | 73/141 |
| 3,427,872 A | 2/1969 | Leep et al. | 73/88.5 |
| 3,537,304 A | 11/1970 | Brewer | 73/136 |
| 3,932,112 A | 1/1976 | Garshelis | 431/255 |
| 3,939,448 A | 2/1976 | Garshelis | 335/215 |
| 3,959,751 A | 5/1976 | Garshelis | 335/3 |
| 3,961,297 A | 6/1976 | Garshelis | 335/3 |
| 4,012,959 A | 3/1977 | Garshelis | 73/398 |
| 4,188,572 A | 2/1980 | Garshelis | 323/9 |

(Continued)

FOREIGN PATENT DOCUMENTS

EP 0 136 086 4/1985

(Continued)

OTHER PUBLICATIONS

Ramsden, Ed. "Ten Easy Things to Do with Magnetic Sensors," Sensors Magazine. Mar. 1997. Accessed [online] Jul. 17, 2007. <http://archives.sensorsmag.com/articles/0397/mar_mag/main/shtml>.*

(Continued)

*Primary Examiner*—Edward Lefkowitz
*Assistant Examiner*—Jonathan Dunlap
(74) *Attorney, Agent, or Firm*—Grossman, Tucker, Perreault & Pfleger, PLLC

(57) ABSTRACT

A torque sensor includes a shaft and a magnetic sensor. The shaft may have at least one active region having an elliptical magnetization. The magnetic sensor may be configured to sense a magnetic field about the shaft, where the magnetic field is representative of a torque applied to the shaft. The elliptical magnetization may have a nonzero axial component directed along a center line axis of said shaft at zero torque.

11 Claims, 11 Drawing Sheets

U.S. PATENT DOCUMENTS

| | | | |
|---|---|---|---|
| 4,319,189 A | 3/1982 | Cullum, Jr. et al. | 324/208 |
| 4,335,608 A | 6/1982 | Wood et al. | 73/301 |
| 4,416,161 A | 11/1983 | Barkhoudarian | 73/862.36 |
| 4,523,482 A | 6/1985 | Barkhoudarian | 73/862.36 |
| 4,566,338 A | 1/1986 | Fleming et al. | 73/862.36 |
| 4,596,150 A | 6/1986 | Kuhr | 73/779 |
| 4,627,298 A | 12/1986 | Sahashi et al. | 73/862.36 |
| 4,760,745 A | 8/1988 | Garshelis | 73/862.36 |
| 4,805,466 A | 2/1989 | Schiessle et al. | 73/862.36 |
| 4,872,350 A | 10/1989 | Kimura | 73/779 |
| 4,881,414 A | 11/1989 | Setaka et al. | 73/862.33 |
| 4,882,936 A | 11/1989 | Garshelis | 73/862.36 |
| 4,896,544 A | 1/1990 | Garshelis | 73/862.36 |
| 4,950,988 A | 8/1990 | Garshelis | 324/207.24 |
| 5,052,232 A | 10/1991 | Garshelis | 73/862.36 |
| 5,195,377 A | 3/1993 | Garshelis | 73/779 |
| 5,239,490 A * | 8/1993 | Masaki et al. | 702/41 |
| 5,351,555 A | 10/1994 | Garshelis | 73/862.335 |
| 5,367,257 A | 11/1994 | Garshelis | 324/207.22 |
| 5,465,627 A | 11/1995 | Garshelis | 73/862.335 |
| 5,520,059 A | 5/1996 | Garshelis | 73/862.335 |
| 5,591,925 A | 1/1997 | Garshelis | 73/862.335 |
| 5,706,572 A | 1/1998 | Garshelis | 29/602.1 |
| 5,708,216 A | 1/1998 | Garshelis | 73/862.335 |
| 5,750,230 A | 5/1998 | Ishikawa et al. | 428/65.3 |
| 5,789,090 A | 8/1998 | Okumura et al. | 428/694 T |
| 5,887,335 A | 3/1999 | Garshells | 29/602.1 |
| 5,889,215 A | 3/1999 | Kilmartin et al. | 73/862.335 |
| 6,047,605 A | 4/2000 | Garshelis | 73/862.336 |
| 6,057,021 A | 5/2000 | Ishikawa et al. | 428/65.3 |
| 6,098,468 A | 8/2000 | Mohri et al. | 73/862.333 |
| 6,121,879 A | 9/2000 | Lian et al. | 340/572.3 |
| 6,145,387 A | 11/2000 | Garshelis | 73/862.336 |
| 6,220,105 B1 | 4/2001 | Cripe | 73/862.69 |
| 6,260,423 B1 | 7/2001 | Garshelis | 73/862.336 |
| 6,346,812 B1 | 2/2002 | May et al. | 324/253 |
| 6,360,841 B1 | 3/2002 | Blandino et al. | 180/443 |
| 6,372,338 B1 | 4/2002 | Jeffers et al. | 428/329 |
| 6,467,360 B1 * | 10/2002 | Bogdanov | 73/862.333 |
| 6,490,934 B2 | 12/2002 | Garshelis | 73/862.336 |
| 6,513,395 B1 | 2/2003 | Jones | 73/862.33 |
| 6,520,274 B1 | 2/2003 | McElmeel, Jr. et al. | 180/144 |
| 6,553,847 B2 | 4/2003 | Garshelis | 73/862.336 |
| 6,554,095 B2 | 4/2003 | Zheng et al. | 180/402 |
| 6,581,480 B1 | 6/2003 | May et al. | 73/862.333 |
| 6,655,471 B2 | 12/2003 | Cripe et al. | 173/176 |
| 6,701,792 B2 | 3/2004 | Laidlaw | 73/862.329 |
| 6,707,292 B2 | 3/2004 | Viola | 324/207.2 |
| 6,758,105 B2 | 7/2004 | Viola et al. | 73/862.08 |
| 6,761,229 B2 | 7/2004 | Cripe et al. | 173/176 |
| 6,765,357 B2 | 7/2004 | Cripe et al. | 318/114 |
| 6,792,817 B2 | 9/2004 | Viola et al. | 73/862.335 |
| 6,807,871 B1 | 10/2004 | Paek | |
| 6,823,746 B2 | 11/2004 | Viola et al. | 73/862.335 |
| 6,864,662 B2 | 3/2005 | Recker | 318/807 |
| 6,910,391 B1 | 6/2005 | May | 73/862.333 |
| 7,024,946 B2 * | 4/2006 | Nehl et al. | 73/862.333 |
| 7,055,399 B2 | 6/2006 | Viola | 73/862.335 |
| 2003/0115972 A1 * | 6/2003 | May | 73/862.333 |
| 2005/0061088 A1 * | 3/2005 | May | 73/862.331 |
| 2006/0123903 A1 * | 6/2006 | Gandel et al. | 73/328 |
| 2007/0034021 A1 * | 2/2007 | Cripe | 73/862.331 |

FOREIGN PATENT DOCUMENTS

| | | |
|---|---|---|
| EP | 0 330 311 | 8/1989 |
| EP | 0525551 | 2/1993 |
| EP | 1274974 | 1/2003 |
| JP | 59181575 | 10/1984 |
| JP | 61195323 | 8/1986 |
| JP | SHO 62-206421 | 9/1987 |
| JP | 03081629 | 4/1991 |
| JP | 03282337 | 12/1991 |
| JP | 03282338 | 12/1991 |
| JP | 04024530 | 1/1992 |
| SU | 708181 | 5/1980 |
| WO | 95/33982 | 12/1995 |
| WO | 96/26420 | 8/1996 |
| WO | 98/52063 | 11/1998 |
| WO | 99/56099 | 11/1999 |
| WO | 01/13082 | 2/2001 |
| WO | 01/27584 | 4/2001 |
| WO | 2005/064281 | 7/2005 |
| WO | 2005/064301 | 7/2005 |
| WO | 2005/064302 | 7/2005 |
| WO | 2005/064303 | 7/2005 |
| WO | 2005/064623 | 7/2005 |

OTHER PUBLICATIONS

Petridis, "Negative Magnetostrictive Delay Lines Used in Sensing Applications", Journal of Optoelectronics and Advanced Materials, vol. 6, No. 2, Jun. 2004, pp. 593-598 (6 pages).

Garshelis, "A Study of the Inverse Wiedemann Effect on Circular Remanence", IEEE Transactions on Magnetics, vol. Mag-10, No. 2, Jun. 1974, pp. 344-358 (15 pages).

Boley, et al., "Effects of Heat-Treatment on Sensitivity" "Production of a Torque Sensor" Magnetoelastic Research Group Western Illinois University Department of Physics (3 pages).

International Search Report and The Written Opinion of the International Searching Authority mailed on Aug. 23, 2007 in corresponding PCT Application Serial No. PCT/US06/60169.

* cited by examiner

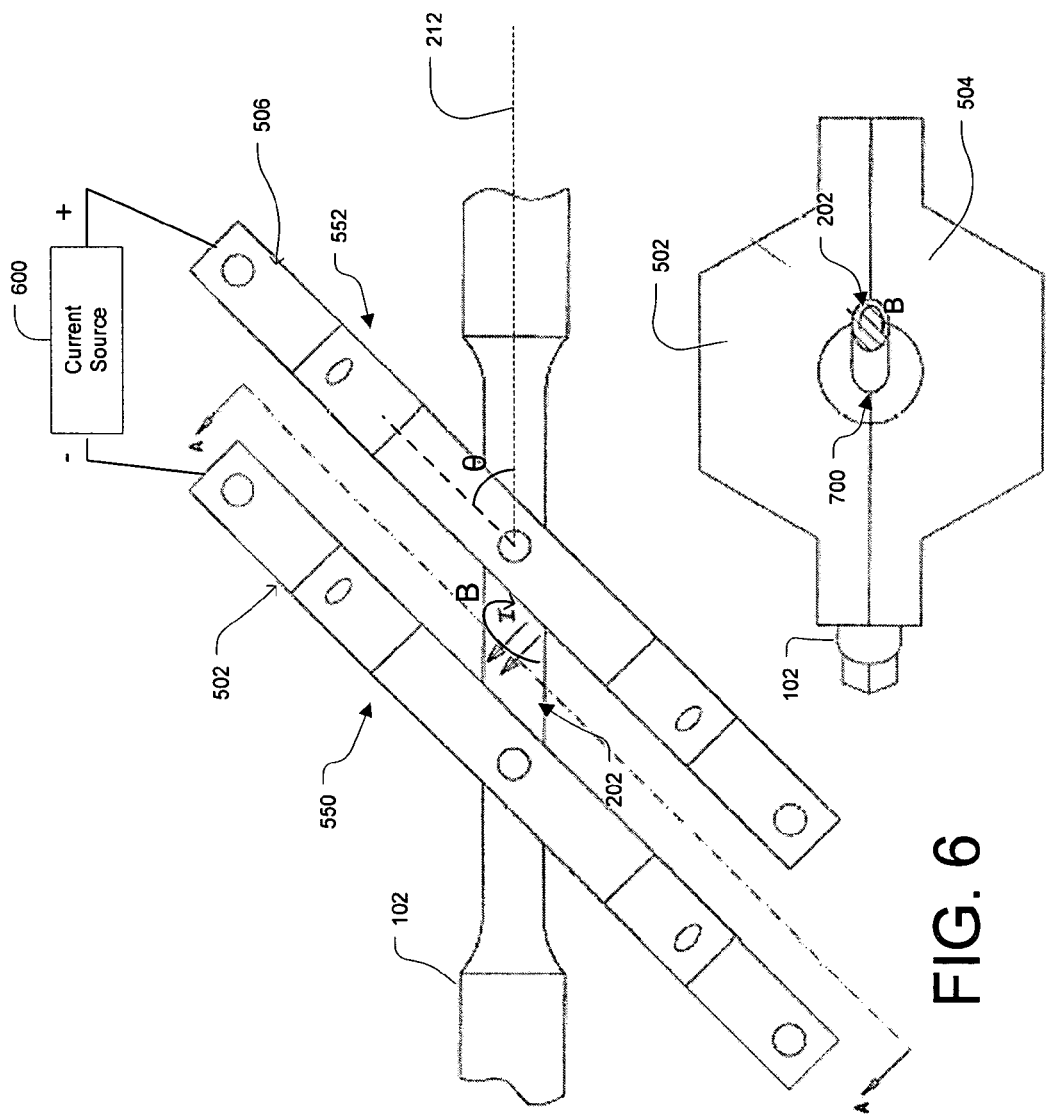

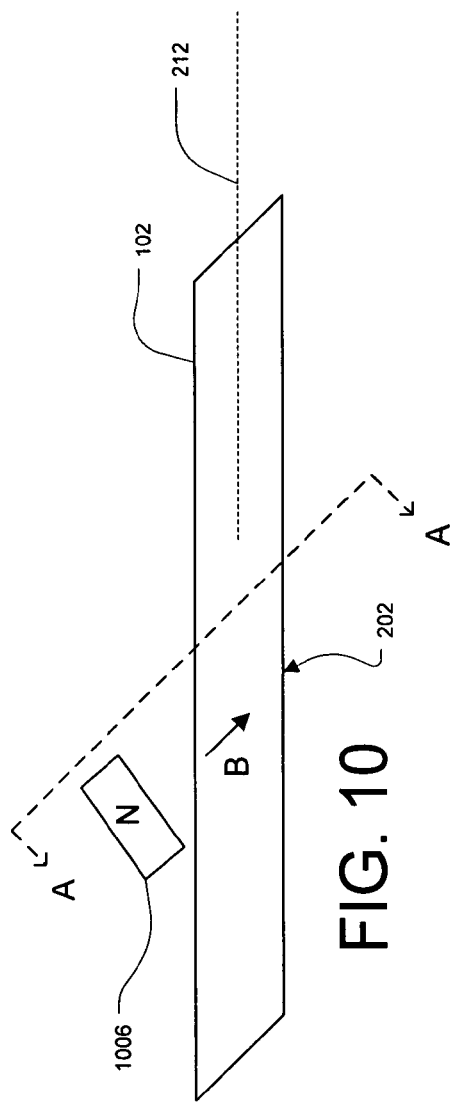
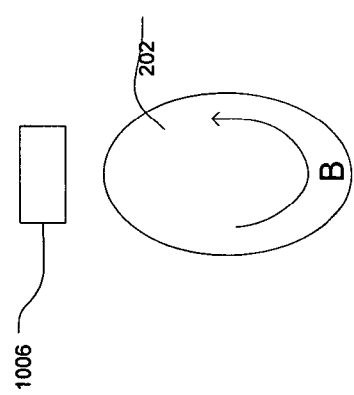
FIG. 10
FIG. 11

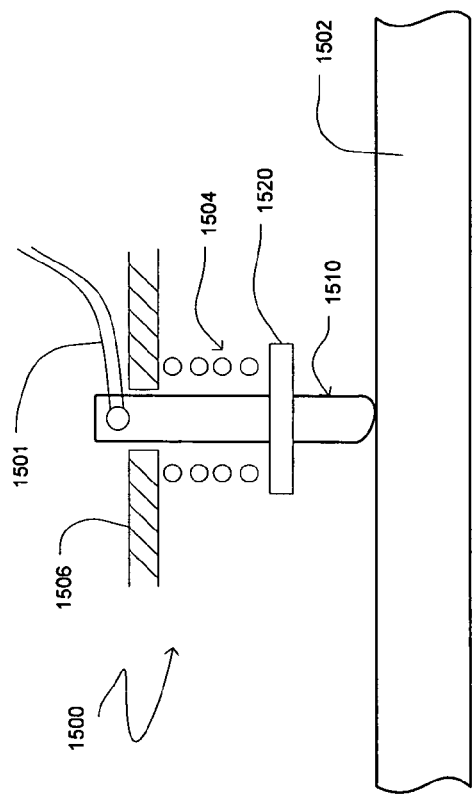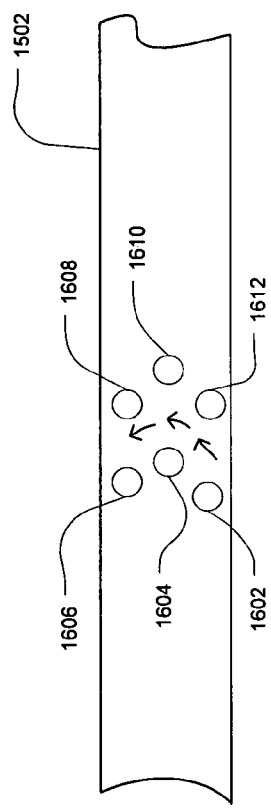

TORQUE SENSOR SYSTEM INCLUDING AN ELLIPTICALLY MAGNETIZED SHAFT

CROSS-REFERENCE TO RELATED APPLICATIONS

The present application claims the benefit of the filing date of U.S. Provisional Application Ser. No. 60/729,383, entitled TORQUE SENSOR SYSTEM INCLUDING A MAGNETIZED SHAFT, filed Oct. 21, 2005.

TECHNICAL FIELD

This disclosure relates to torque sensors, and more particularly to a torque sensor having an elliptical magnetization.

BACKGROUND

In the control of systems having rotating shafts, torque is a fundamental parameter of interest. Accordingly, torque sensors for sensing the torque applied to a rotating shaft have been developed. Torque sensors that do not contact the rotating shaft are desirable. Non-contact torque sensors may create and/or monitor a magnetic field about a rotating shaft that is proportional to the torque applied to the shaft.

In one known configuration, the rotating shaft, or one or more axial portions thereof, may be circumferentially magnetized, i.e., magnetically polarized in direction following a circular path coaxial with the axis of the shaft. When the shaft is under zero torque, the magnetic field established by the shaft does not include a component in the direction of the shaft axis. When torque is applied to the shaft, the circumferential magnetic field becomes increasingly helical with increasing torque. The helical magnetization resulting from the applied torque includes an axial component in the direction of the axis of the shaft and a circumferential component. The axial component may be directly proportional to the applied torque. A magnetic sensor located proximate the shaft may detect the axial component and provide an output indicative of the level of torque applied to the shaft.

Proper magnetization of the shaft in such an embodiment is critical to operation. Manufacturing errors in magnetizing the shaft or in assembling the shaft in the system, can lead to a complete failure of the sensor system. Also, the shaft magnetization may weaken over time. However, the lack of a sensible axial field component when the shaft is at zero torque does not allow a simple, passive external means for determining if the shaft is magnetized properly or even magnetized at all.

One known approach to providing a sensor having a quiescent axial magnetic field at zero torque involves circumferentially magnetizing a shaft while the shaft is under a predetermined torque. Since the circumferential field is induced in the presence of the predetermined torque, a non-measurable axial field component occurs at the torque applied during magnetization, and when the torque on the shaft is removed the circumferential field is skewed resulting in a quiescent axial field component. Although such a configuration allows diagnostics at zero torque, it also suffers from several deficiencies. For example, magnetizing the shaft under a predetermined torque is a cumbersome and expensive process that does not allow facile large volume production.

Accordingly, there is a need for a torque sensor system including a magnetized shaft providing a measurable axial field component at zero torque that may be efficiently and cost-effectively produced.

BRIEF DESCRIPTION OF THE DRAWINGS

Features and advantages of embodiments of the disclosed subject matter will become apparent as the following Detailed Description proceeds, and upon reference to the Drawings, where like numerals depict like parts, and in which:

FIG. 6 is a top view of the shaft and magnetizing clamps of FIG. 5;

FIG. 7 is a cross-sectional view of the shaft and magnetizing clamps of FIG. 6 taken along the line A-A of FIG. 6;

FIG. 10 is a view of a shaft and permanent magnet tilted relative to the shaft to illustrates another method of inducing elliptical magnetization in a shaft consistent with the present invention;

FIG. 11 is a cross-sectional view of the shaft and permanent magnet of FIG. 10 taken along the line A-A of FIG. 10;

FIG. 15 is a view of one embodiment of a conductive pin; and

FIG. 16 is a view of a shaft having a plurality of conductive pins to provide a plurality of contact points about the shaft to form a shaft including an active region having a signature magnetization.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

The description provided herein is with reference to various exemplary embodiments. It is to be understood that the embodiments described herein are presented by way of illustration, not of limitation. The present invention may be incorporated into a wide variety of systems without departing from the spirit and scope of the invention.

Figure 1:
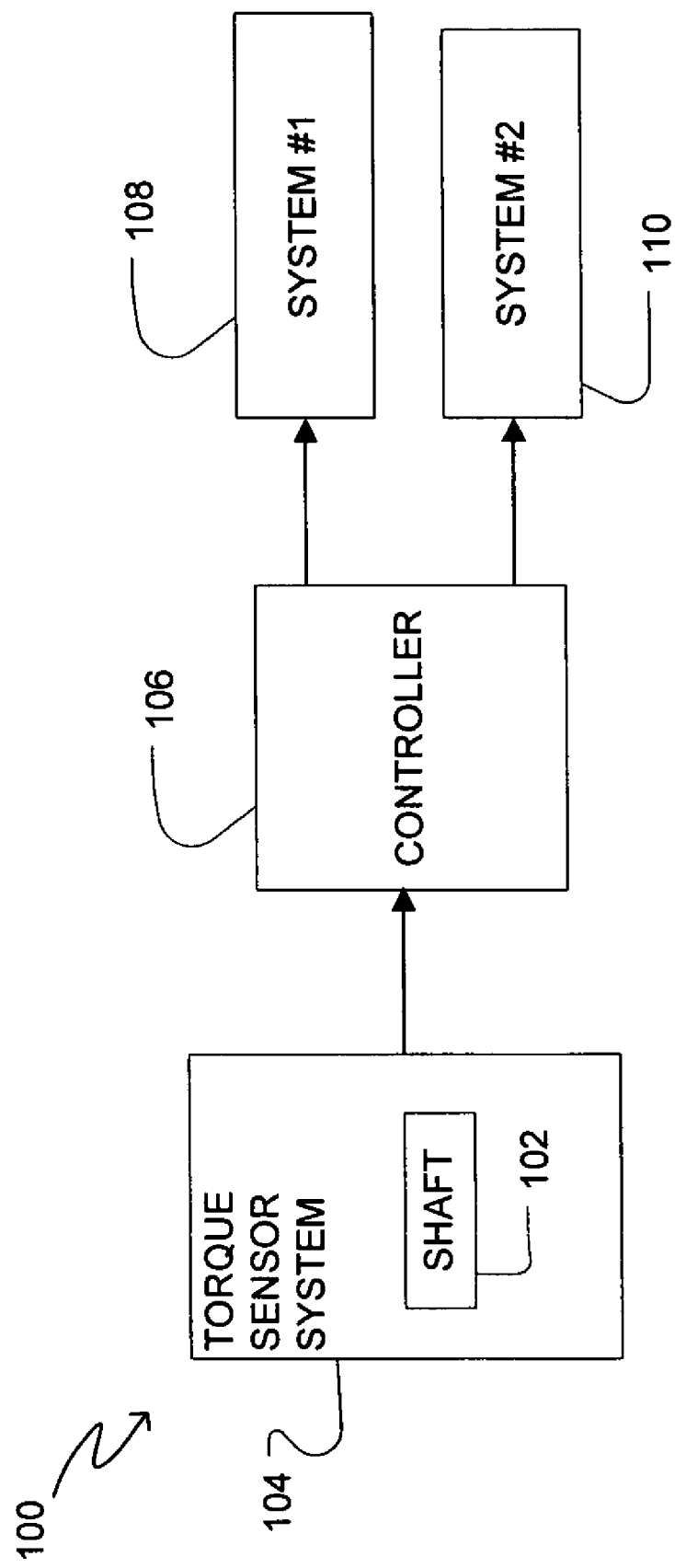
FIG. 1 is a block diagram of an exemplary system consistent with the present invention.

Turning now to FIG. 1, there is shown in block diagram form one exemplary embodiment of a system 100 including a torque sensor 104 consistent with the present invention. As shown, the system 100 may include a controller 106 and one or more systems 108 and 110 controlled by the controller 106. The torque sensor 104 may monitor the torque applied to the shaft 102. In one embodiment, the shaft 102 may be coupled, to or form a portion of, a power take-off shaft of a tractor. An output representative of the torque applied to the power take-off may be coupled from the torque sensor 104 to the controller 106. The controller may control the systems 108 and 110 in response to the torque sensor output.

In another embodiment, the shaft 102 may be coupled to, or form a portion of, a steering shaft of a vehicle steering system. The torque sensor 104 may provide an output representative of the torque applied to the steering wheel shaft to the controller 106. The controller 106 may control one or more vehicle systems 108, 110 in response to the torque sensor output. For example, system 108 may include an automatic braking system where braking is influenced by the torque applied to the steering wheel shaft. If an operator of the vehicle is performing an evasive maneuver, the torque sensor 104 may sense sufficient torque over a threshold level applied to the steering wheel shaft. In response, the controller 106 may provide a control signal to the automatic braking system 108. The braking system 108 may then selectively manage the vehicle brakes to control the vehicle. The system 110 may be a traction control system wherein engine responsiveness and other parameters are influenced by the torque applied to the steering wheel shaft.

Figure 2:
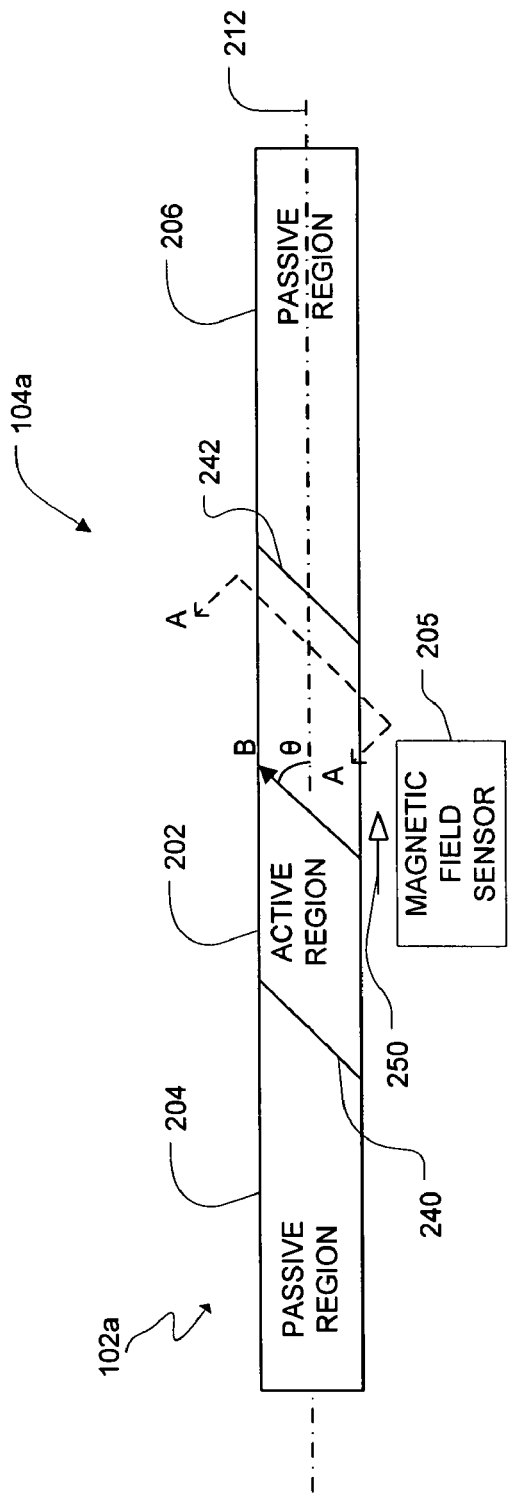
FIG. 2 diagrammatically illustrates an exemplary torque sensor consistent with the present invention.

FIG. 2 diagrammatically illustrates one exemplary embodiment of a torque sensor 104a consistent with the present invention. The illustrated exemplary torque sensor system includes a cylindrical shaft 102a including an elliptically magnetized active region 202 and a magnetic field sensor 205. The active region 202 may be established by magnetizing a portion of a homogenous shaft between two passive regions 204 and 206. The shaft 10 may be formed of a magneto restrictive material capable of maintaining a magnetization induced therein following repeated application of torque and returning the magnetization to the direction established at polarization when the torque is reduced to zero. A variety of materials exhibiting these properties are well known to those of ordinary skill in the art. Some exemplary materials for forming the shaft are described in detail in U.S. Pat. No. 6,553,847, the teachings of which are incorporated herein by reference.

A variety of configurations for the magnetic field sensors 205 useful in connection with the present invention are also well known to those of ordinary skill in the art. In one embodiment, for example, the magnetic field sensors may be configured as fluxgate sensors. Hall Effect sensors may also or alternatively be used depending on the level of the sensed field.

With continued reference to FIG. 2, consistent with the present invention the active region 202 may be elliptically magnetized when the shaft is under zero torque. As used herein "elliptically magnetized" and "elliptical magnetization" refer to a magnetic polarization of a shaft established at an oblique angle to the centerline axis of the shaft in a non-circular elliptical path around the shaft. As shown, for example, the active region 202 may be polarized in a direction indicated by arrow B at an oblique angle $\theta$ to a center line axis 212 of the shaft. In one embodiment an elliptical magnetization may be imparted with a direction of polarization at an angle $\theta$ between about 10° and 80°. It should be understood, however, that although the angle $\theta$ is illustrated in FIG. 2 as being less than 90 degrees, the angle $\theta$ may also be greater than 90 degrees depending the desired orientation of the elliptical magnetization, and may be selected to establish a desired magnitude of the axial component 250 at zero torque. Also, the active region may extend over an axial extent of the shaft between a first end 240 and second end 242 that are substantially parallel with the direction of magnetization B. The axial extent of the active region may be selected depending upon the application, e.g. to accommodate manufacturing or operating tolerances in the axial position of the shaft.

Advantageously, the elliptically magnetized active region 202 establishes a magnetic field including a nonzero axial component 250 that may be sensed by the magnetic field sensor when the shaft 102 is at zero torque. This allows for diagnostic testing to ensure proper magnetization, installation and/or calibration of the shaft 102. As torque is applied to the shaft in any direction, the elliptical magnetization may be skewed from its original position at zero torque resulting in a change in the magnitude of axial component of the magnetic field. The change in the axial component of the magnetic field may be proportional to the applied torque. The magnetic field sensor 205 may sense the magnitude of the axial component and provide an output signal representative of the torque applied to the shaft 102.

Although sensing a nonzero axial component 250 of the magnetic field at zero torque, electronics (not illustrated) may be coupled to the magnetic sensor 205 and may be configured to adjust the sensed output at zero torque to varying voltage levels. In one instance, the varying voltage level may be set to half the input voltage or other voltage levels that are similar to a voltage level present in a conventional sensor that does not sense an axial component of the magnetic field at zero torque. However, the electronics in this instance may also be capable of changing the output voltage value in order to allow for diagnostic testing to ensure proper magnetization, installation, and/or calibration of the shaft 102.

Figure 3:
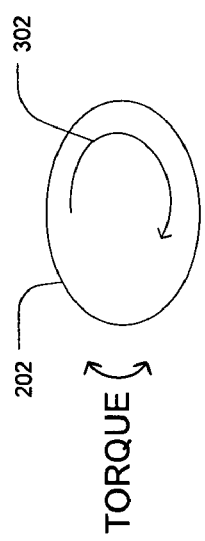
FIG. 3 is a cross-sectional view of the shaft of FIG. 2 taken along the line A-A of FIG. 2 illustrating elliptical magnetization of the shaft.

FIG. 3 is a cross-sectional view of the shaft of FIG. 2 taken along the line A-A of FIG. 2 illustrating the elliptical magnetization of the shaft. The line A-A is taken along the direction of magnetization B at the angle $\theta$ to the center line axis 212 of the shaft. As such, the cross sectional view of the active region of the shaft is elliptically shaped illustrating the elliptical direction of magnetization of the active region indicated by arrow 302.

Figure 4:
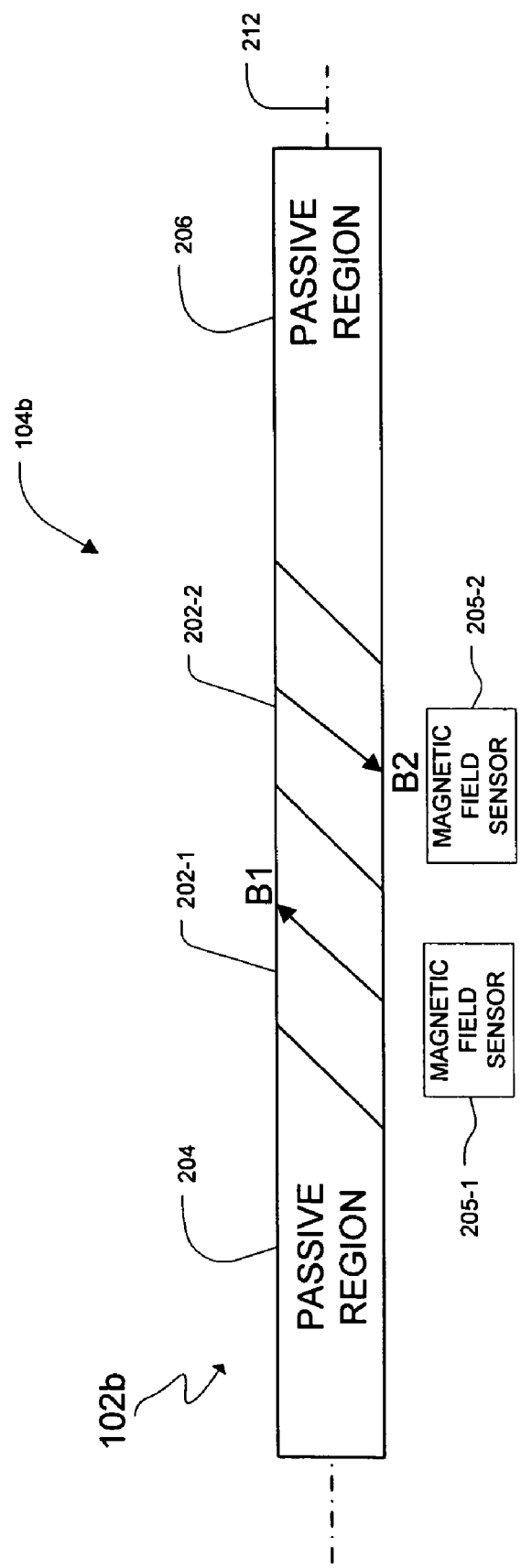
FIG. 4 diagrammatically illustrates another exemplary torque sensor consistent with the present invention.

A torque sensor system consistent with the present invention may include a plurality of magnetized active regions. FIG. 4, for example, diagrammatically illustrates an exemplary embodiment of a torque sensor system 104b including a shaft 102b having first 202-1 and second 202-2 elliptically magnetized active regions and associated first 205-1 and second 205-2 magnetic field sensors. In the illustrated exemplary embodiment, the direction of polarization of the active region 202-1 indicated by arrow B1 is in the opposite direction compared to the direction of polarization of the active region 202-2 indicated by arrow B2. Providing the active regions with opposed magnetization directions may allow for differential sensing using sensors 205-1 and 205-2 to facilitate noise cancellation. Although the illustrated embodiment shows two active regions, any number of active regions may be provided. In addition, the active regions may be elliptically magnetized at the same oblique angle relative to the centerline axis 212 of the shaft, or at different angles.

Figure 5:
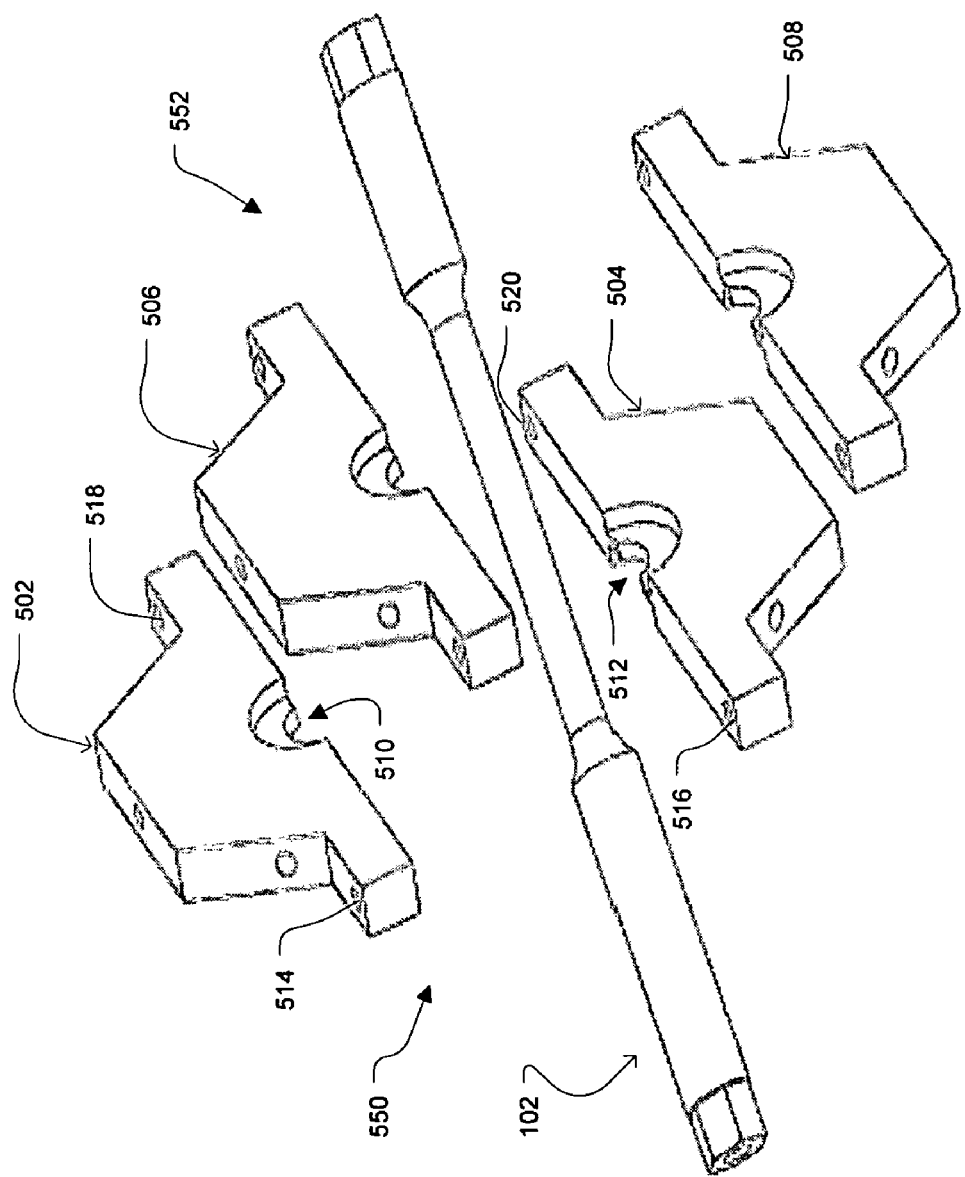
FIG. 5 is a perspective view of a shaft and pairs of magnetizing clamps to illustrate one method of inducing elliptical magnetization in a shaft consistent with the present invention.

Turning now to FIGS. 5-7, there is illustrated one exemplary system and method for inducing an elliptical magnetization in a shaft consistent with the present invention. In general, the illustrated exemplary embodiment establishes an elliptical magnetization by providing a current through an active region of a shaft at an oblique angle to the center line axis of the shaft. FIG. 5 illustrates a portion of the shaft 102 and first 550 and second 552 magnetizing clamp assemblies. The first magnetizing clamp assembly 550 includes an upper clamp 502 and a lower clamp 504. The upper clamp 502 may include portions defining a first portion 510 of a shaft opening, and the lower clamp 504 may include portions defining a second portion 512 of the shaft opening. When the upper 502 and lower 504 clamps are joined, e.g. using fasteners extending through openings 514, 516, 518 and 520, the first 510 and second 512 portions of the shaft opening defined by the upper and lower clamp portions may be positioned in opposed relationship to define a shaft opening 700 having an elliptically-shaped cross section, as illustrated in FIG. 7. The second magnetizing clamp assembly 552 may be constructed in a manner similar to the first magnetizing clamp assembly 550, including upper 506 and lower 508 clamps, which join to define shaft opening having an elliptically-shaped cross section.

As shown in FIG. 6, when the upper 502 and lower 504 clamps of the first clamp assembly 550 and the upper 506 and lower 508 clamps of the second clamp assembly 552 are joined about the shaft 102, the first 550 and second 552 clamp assemblies are disposed at an oblique angle to the centerline axis 212 of the shaft corresponding to the intended angle θ of the elliptical magnetization. A current source 600 may be coupled to the first and second magnetizing clamp assemblies for establishing current flow through the shaft indicated by arrows I from the second clamp assembly to the first clamp assembly. The current flow I results in an elliptical magnetization of the active region 202 indicated by arrow B, and further illustrated in the cross-sectional view of FIG. 7 taken along the line A-A of FIG. 6. The elliptical magnetization exhibits a nonzero axial component at zero torque.

The magnitude of the field induced in the shaft may depend on the requirements of the intended application. In one embodiment, a current of 400 A may be used to elliptically magnetize a shaft for achieving a field strength at the shaft surface of about 3000 Gauss. The shaft magnetization may decrease from the shaft surface to the center of the shaft. In another embodiment, the current source may provide a current of 1,000 A for elliptically magnetizing the shaft.

Figure 8:
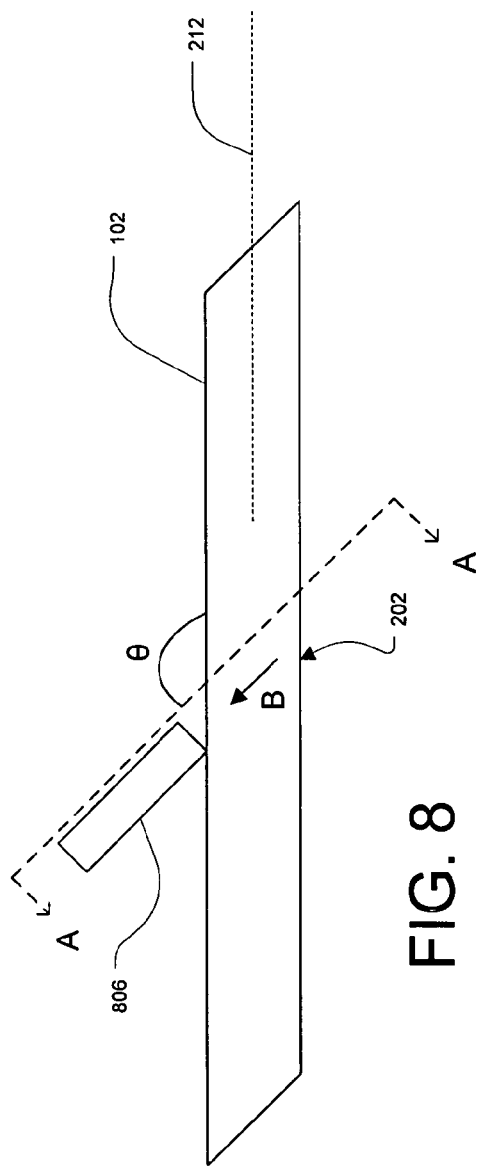
FIG. 8 is a view of a shaft and electromagnet tilted relative to the shaft to illustrate another method of inducing elliptical magnetization in a shaft consistent with the present invention.
Figure 9:
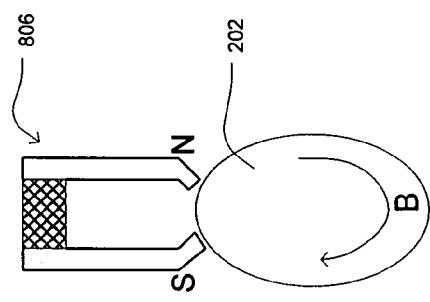
FIG. 9 is a cross-sectional view of the shaft and electromagnet of FIG. 8 taken along the line A-A of FIG. 8.

FIGS. 8-9 illustrate another exemplary system and method for inducing an elliptical magnetization in a shaft consistent with the present invention. In the illustrated exemplary embodiment, the shaft 102 is magnetized to include an active region 202 using an electromagnet 806 oriented at oblique angle θ to the center line 212 of the shaft. FIG. 9 is a cross-sectional view of the shaft and electromagnet 806 of FIG. 8 taken along the line A-A of FIG. 8 further illustrating the elliptical magnetization of the active region 202 induced by the electromagnet 806.

FIGS. 10-11 illustrate another exemplary system and method for inducing an elliptical magnetization in a shaft consistent with the present invention. In the illustrated exemplary embodiment, the shaft 102 is magnetized to include an active region 202 using a permanent magnet 1006 oriented at an oblique angle θ to the center line 212 of the shaft. FIG. 11 is a cross-sectional view of the shaft and permanent magnet of FIG. 10 taken along the line A-A of FIG. 10 further illustrating the elliptical magnetization of the active region 202 induced by the permanent magnet 1006.

Figure 12:
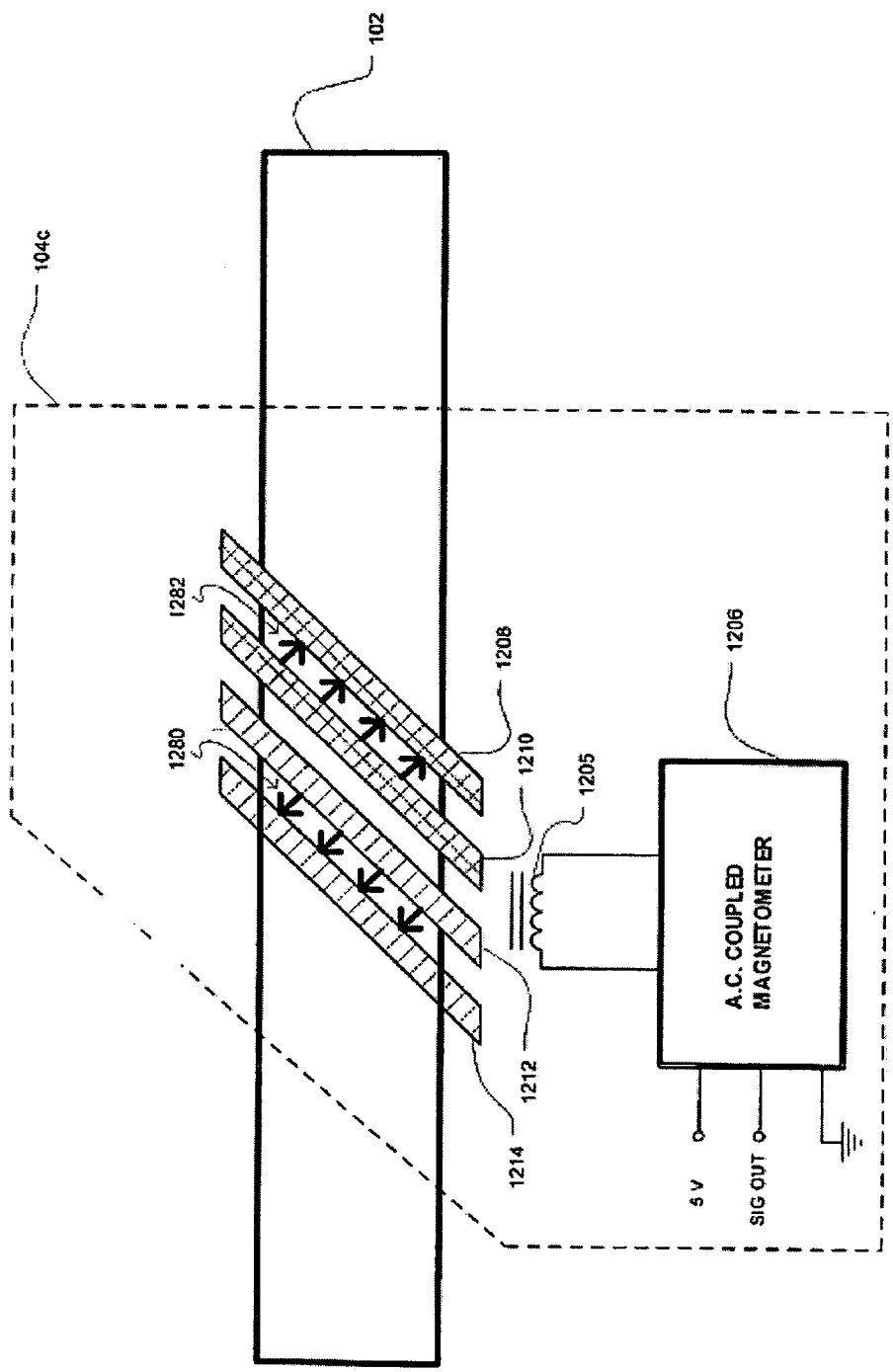
FIG. 12 diagrammatically illustrates another embodiment of a torque sensor having two elliptically magnetized regions with AC analysis of a time varying magnetic field as the shaft rotates.

FIG. 12 illustrates another embodiment 104c of a torque sensor consistent with the present invention. The illustrated exemplary embodiment includes first 1280 and second 1282 active regions with elliptical magnetization. The first active region 1280 may be established by providing a current from the magnetizing clamp 1212 to the magnetizing clamp 1214, as illustrated by the arrows between clamps 1212 and 1214. Similarly, the second active region 1282 may be established by providing a current from the magnetizing clamp 1210 to the magnetizing clamp 1208, as illustrated by the arrows between clamps 1210 and 1208. The torque sensor 104c may include a fluxgate coil 1205 and an A.C. coupled magnetometer 1206.

In operation, the fluxgate coil 1205 may sense alternating magnetic polarities as the shaft rotates due to the elliptical magnetizations of the active regions of the shaft. For a constant applied torque, the output of the magnetometer 1206 may be an alternating signal having an amplitude proportional to the applied torque. The frequency of the alternating signal may be proportional to the shaft speed to provide shaft speed measurements in addition to torque measurements. By A.C. coupling the magnetometer 1206, any undesired D.C. or slowly varying magnetic fields, such as common mode field signals, may be rejected.

Accordingly, the torque sensor 104c having elliptical magnetization produces a time varying magnetic field sensed by the fluxgate coil 1205. Only one fluxgate coil 1205 may be necessary. The A.C. processing of the torque sensor 104c may automatically reject undesired slowly varying common mode magnetic fields. The complexity of the signal processing may therefore be significantly reduced compared to conventional D.C. processing. In addition, A.C. processing may eliminate D.C. offsets and system noise associated with D.C. processing (1/f noise). D.C. drift in the output may also be avoided, and signal-to-noise (S/N) levels of the output signal may be improved compared to conventional D.C. processing.

Figure 13:
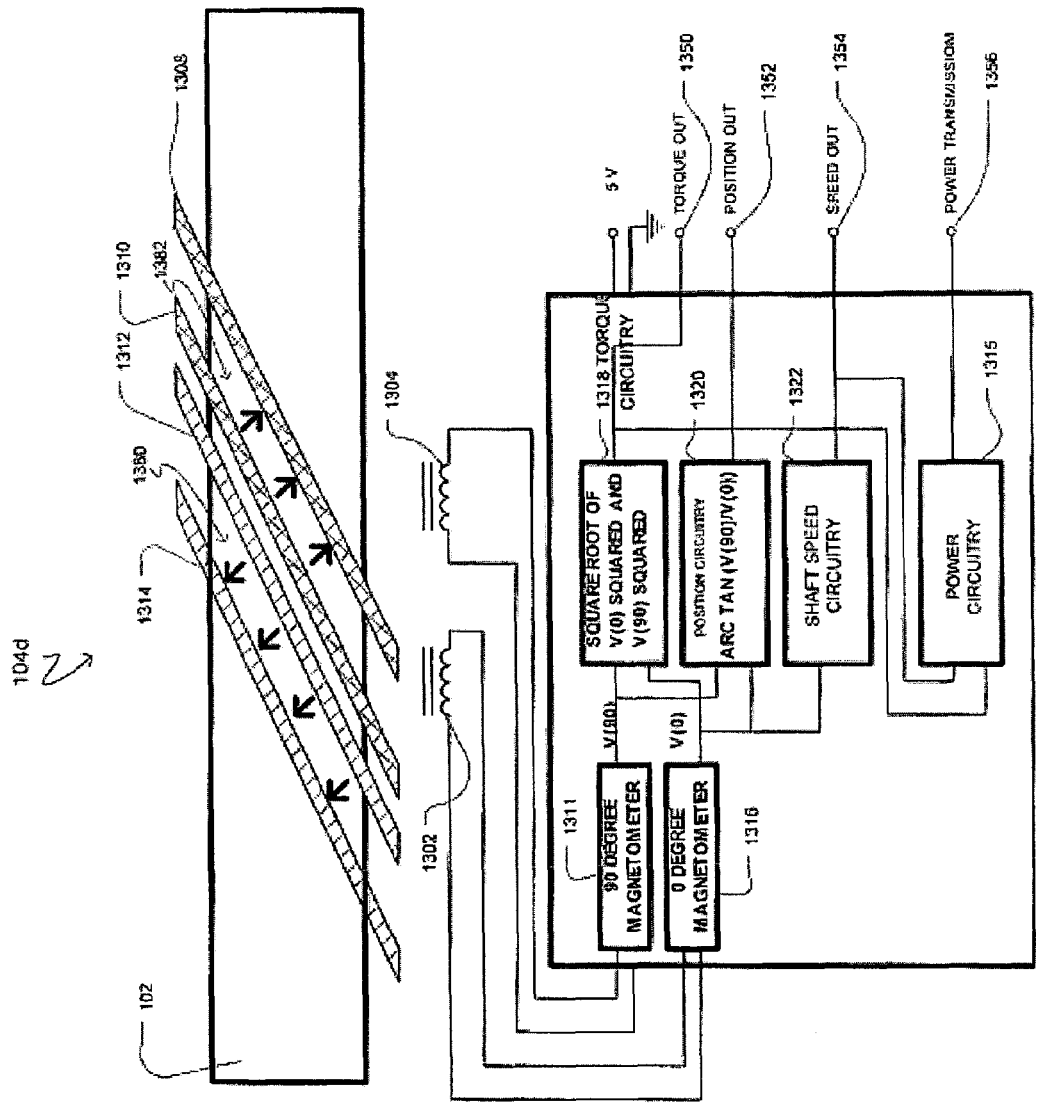
FIG. 13 diagrammatically illustrates another embodiment of a torque sensor having two elliptically magnetized regions with AC analysis of a time varying magnetic field as the shaft rotates to concurrently monitor shaft parameters in addition to torque.

FIG. 13 illustrates an embodiment 104d of the torque sensor including first 1380 and second 1382 active regions with elliptical magnetization, and first 1302 and second 1304 fluxgate coils. The first 1302 and second 1304 fluxgate coils may be coupled to associated magnetometers 1316, 1311, respectively. The elliptical magnetization may produce a time-varying magnetic field sensed by the fluxgate coils as the shaft rotates. In addition to monitoring torque, the sensor 104d of FIG. 13 may monitor parameters such shaft position, shaft speed, and the power transmitted by the shaft.

The flux gate coils 1302 and 1304 may be positioned about the shaft so that the signals to the associated magnetometers 1316 and 1311 are time-varying and 90 degrees out of phase with each other. Additional circuitry 1318, 1320, 1322, and 1315 may utilize one or both of the outputs of the magnetometers 1316 and 1311, either directly or indirectly, to monitor torque, shaft position, shaft speed, and power transmitted.

Figure 14:
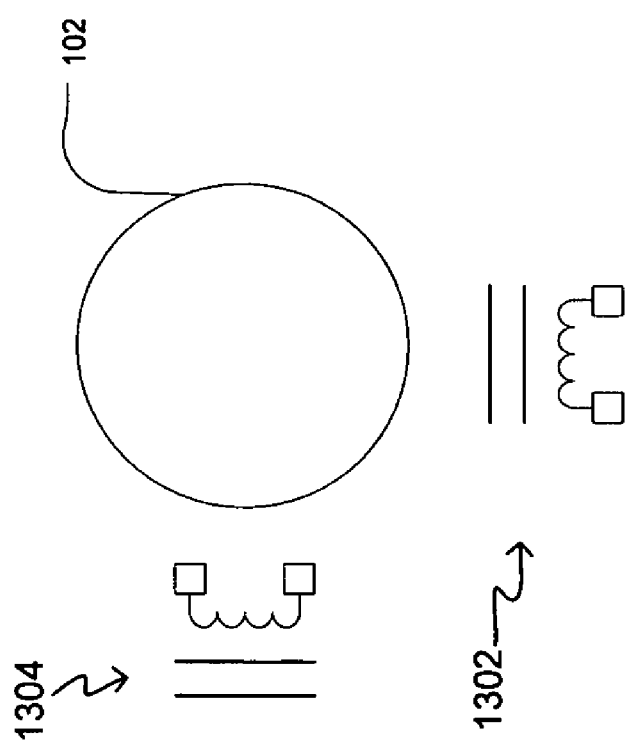
FIG. 14 is a transverse cross-section of the active region of the shaft of FIG. 13 illustrating an example of radial displacement of the two fluxgate coils of FIG. 13.

In the exemplary embodiment illustrated in FIG. 13, the flux gate coils 1302 and 1304 are axially spaced about relative to the active regions 1380, 1382 to produce time-varying signals 90 degrees out of phase with each other. The flux gate coils 1302 and 1304 may also, or alternatively, be circumferentially displaced relative to the shaft. FIG. 14, for example, illustrates the coils 1302 and 1304 spaced at 90 degrees from each other around the circumference of the shaft to provide time-varying signals 90 degrees out of phase with each other.

In operation, the output signal of the 0 degree magnetometer 1316 may be a time varying voltage signal that is 90 degrees out of phase with the time varying voltage signal output from the 90 degree magnetometer 1311. Torque circuitry 1318 may accept the output signals from the magnetometers 1316 and 1311 and provide an output signal at terminal 1350 representative of torque applied to the shaft. The torque circuitry 1318 may calculate the magnitude of the square root of the sum of the square of the two magnetometer output signals to provide the output signal representative of the applied torque.

The position circuitry 1320 may accept the output signals from both magnetometers 1316 and 1311 and provide an output signal representative of a position of the shaft at terminal 1352. The position circuitry 1320 may calculate the arc tangent of the ratio of the output signal of the 90 degree magnetometer 1311 to the 0 degree magnetometer 1316 to provide the output signal representative of the position of the shaft.

The shaft speed circuitry 1322 may accept one output signal from either the 90 degree magnetometer 1311 or the 0 degree magnetometer 1316 and provide an output signal representative of the speed of the shaft at terminal 1354. The shaft speed circuitry 1322 may analyze the frequency of the input time varying signal to ascertain the speed of the shaft. Finally, the product circuitry 1315 may multiply the output signal of the torque circuitry 1318 with the output of the shaft speed circuitry 1322 to determine the power transmitted through the shaft. An output signal representative of the power transmitted through the shaft may then be provided at terminal 1356. Those skilled in the art will recognize various circuitry configurations to provide the functionality of circuitry 1318, 1320, 1322, and 1315.

FIGS. 15-16 illustrate another embodiment including a shaft having one or more active regions including a signature magnetization. To induce a signature magnetization, a plurality of conductive pins may be positioned for passing current through the shaft in a pattern configured establish the signature magnetization. FIG. 15 illustrates an example of a conductive pin 1500 that may be utilized to provide a conductive contact point for passing current through the shaft. The pin 1500 may include a nonconductive fixture plate 1506 and a conductive contact pin 1510. A spring 1504 may be provided between a portion of the nonconductive fixture plate 1506 and a portion 1520 of the conductive contact pin 1510 to bias the contact pin 1510 against the shaft 1502.

FIG. 16 illustrates one exemplary embodiment including six conductive pins providing six contact points 1602, 1604, 1606, 1608, 1610, and 1612, respectively, on the surface of the shaft to establish a unique magnetic signature. A current source may be programmed to sequentially pass current through selected pairs of the contact pins to create a magnetic signature inside the shaft. The magnetic signature may be utilized to make additional non-torque measurements such as speed of rotation measurements. The magnetic signature may provide several poles in one revolution of the shaft to provide additional resolution in speed sensing. The magnetic signature may also create a time varying signal which may be different from a sine/cosine signal and which can be uniquely differentiated from sinusoidal noise.

In summary, there is provided a torque sensor having at least one active region and a magnetic sensor. The at least one active region may have an elliptical magnetization. The magnetic sensor may be configured to sense a magnetic field about the shaft, wherein the magnetic field is representative of a torque applied to the shaft.

There is also provided a method of monitoring a torque applied to a shaft. The method may include magnetizing an active region of the shaft to have an elliptical magnetization; and monitoring a magnetic field about the shaft, the magnetic field being representative of the torque applied to the shaft.

According to another embodiment, there is also provided a torque sensor that may include a shaft having first and second active regions, each of the first and second active regions having an elliptical magnetization. The torque sensor may further include a first fluxgate coil positioned about the shaft and coupled to a first magnetometer, the first magnetometer configured to provide a first sinusoidal signal as the shaft is rotated; a second fluxgate coil positioned about the shaft and coupled to a second magnetometer, the second magnetometer configured to provide a second sinusoidal signal as the shaft is rotated, the second sinusoidal signal ninety degrees out of phase with the first sinusoidal signal; and torque circuitry configured to accept the first and second sinusoidal signals and provide an output signal representative of torque applied to the shaft.

Advantageously, the active region of the shaft has an elliptical magnetization. Therefore, an axial component of the elliptical magnetization is present at zero torque. The axial component can be monitored at zero torque to verify that the active region is indeed magnetized and is magnetized to the desired level. If the shaft is part of a vehicle, it is therefore possible to diagnose the shaft in the vehicle without removing the shaft or subjecting the shaft to torque. The amount of the axial field at zero torque may also be precisely controlled with the angle of magnetization to accommodate varying applications. In cases where there are two magnetic zones, the direction of the magnetic field at zero torque can be adjusted to create different outputs for different applications and electronic diagnostics.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A torque sensor comprising:
   a shaft having at least one active region, said at least one active region having an elliptical magnetization; and
   a magnetic sensor configured to sense a magnetic field about said shaft, said magnetic field being representative of a torque applied to said shaft,
   wherein said elliptical magnetization is induced by current driven between a pair of magnetizing clamps, said pair of magnetizing clamps oriented in parallel with each other and further oriented at an oblique angle with respect to a center line axis of said shaft, wherein said elliptical magnetization has a nonzero axial component along a center line axis of said shaft at zero torque, and wherein said nonzero axial component at zero torque is at least partially dependent on a value of said oblique angle.

2. The torque sensor of claim 1, wherein said magnetic sensor is configured to sense said nonzero axial component at zero torque.

3. The torque sensor of claim 1, wherein nonzero axial component changes as said torque is applied to said shaft.

4. The torque sensor of claim 1, wherein said magnetic field sensed by said magnetic sensor comprises alternating magnetic polarities as said shaft is rotated and said magnetic sensor provides a sinusoidal signal having an amplitude representative of said torque applied to said shaft.

5. The torque sensor of claim 4, wherein a frequency of said sinusoidal signal is representative of a speed of said shaft.

6. A method of monitoring a torque applied to a shaft comprising:

magnetizing an active region of said shaft to have an elliptical magnetization, said magnetizing comprising:

orientating a pair of magnetizing clamps about said shaft, said pair of magnetizing clamps oriented in parallel with each other and at an oblique angle with respect to a center line axis of said shaft, and driving a current between said pair of magnetizing clamps; and monitoring a magnetic field about said shaft, said magnetic field being representative of said torque applied to said shaft.

7. The method of claim 6, wherein said elliptical magnetization has a nonzero axial component directed along a center line axis of said shaft at zero torque.

8. The method of claim 6, wherein said oblique angle is between about 10 degrees and 80 degrees.

9. The method of claim 6, wherein said elliptical magnetization has an axial component along a center line axis of said shaft at zero torque, and wherein said axial component changes as said torque is applied to said shaft.

10. The method of claim 6, wherein said monitored magnetic field comprises alternating magnetic polarities as said shaft is rotated and wherein said method further comprises providing a sinusoidal signal having an amplitude representative of said torque applied to said shaft.

11. The method of claim 10, wherein a frequency of said sinusoidal signal is representative of a speed of said shaft.

\* \* \* \* \*